United States Patent [19]

Hidaka et al.

[11] Patent Number: 4,918,692

[45] Date of Patent: Apr. 17, 1990

[54] AUTOMATED ERROR DETECTION FOR MULTIPLE BLOCK MEMORY ARRAY CHIP AND CORRECTION THEREOF

[75] Inventors: Hideto Hidaka; Kazuyasu Fujishima; Yoshio Matsuda, all of Hyogo, Japan

[73] Assignee: Mitsubishi Denki Kabushiki Kaisha, Tokyo, Japan

[21] Appl. No.: 201,413

[22] Filed: Jun. 2, 1988

[30] Foreign Application Priority Data

Jun. 3, 1987 [JP] Japan .................. 62-139174

[51] Int. Cl.⁴ ............................................. G06F 11/10
[52] U.S. Cl. .................................... 371/2.2; 371/40.1
[58] Field of Search .............. 371/2, 21, 11, 10, 2.2, 371/21.1, 11.1, 10.1, 40.1; 365/200, 201, 96

[56] References Cited

U.S. PATENT DOCUMENTS

| | | | |
|---|---|---|---|
| 3,644,902 | 2/1972 | Beausoleil | 371/2 |
| 3,812,336 | 5/1974 | Bossen et al. | 371/2 |
| 4,479,214 | 10/1984 | Ryan | 371/11 |
| 4,485,471 | 11/1984 | Singh et al. | 371/2 |
| 4,488,298 | 12/1984 | Bond et al. | 371/11 |
| 4,506,364 | 3/1985 | Aichelmann, Jr. et al. | 371/38 |
| 4,532,607 | 7/1985 | Uchida | 365/96 |
| 4,584,682 | 4/1986 | Shah et al. | 371/10 |
| 4,720,817 | 1/1988 | Childers | 365/200 |
| 4,734,885 | 3/1988 | Luich | 365/96 |

OTHER PUBLICATIONS

IBM Technical Disclosure Bulletin: "Word Line, Bit Line Address Interchanging to Enhance Memory Fault Tolerance", by S. Singh et al., N. 26, No. 6, 11/83; pp. 2747-2748.

IBM J. Res. Develop.: "Error-Correcting Codes for Semiconductor Memory Applications: A State-of-the-Art Review", by C. L. Chen et al., V. 28, No. 2, 3/84, pp. 124-134.

Primary Examiner—Charles E. Atkinson
Attorney, Agent, or Firm—Lowe, Price, Leblanc, Becker & Shur

[57] ABSTRACT

A semiconductor memory device comprises a plurality of memory cell array blocks. An address changing system is provided in each memory cell array block. The same address signal is applied to these address changing systems. Each address changing system comprises a plurality of linking devices. By previously blowing out any of the linking devices in each address changing system, an externally applied address signal is changed with another address signal to be applied to a corresponding memory cell array block.

9 Claims, 11 Drawing Sheets

|  | DB0 | | DB3 | | | DB7 | CB0 | | | CB3 |
|---|---|---|---|---|---|---|---|---|---|---|---|---|
| Ad1 | ○ | ○ | × | ○ | ○ | ○ | × | ○ | ○ | ○ | ○ | ○ |
| Ad2 | ○ | ○ | ○ | ○ | ○ | ○ | ○ | ○ | ○ | ○ | ○ | ○ |

FIG.10

|  | DB0 | | DB3 | | | DB7 | CB0 | | | CB3 |
|---|---|---|---|---|---|---|---|---|---|---|---|---|
| Ad1 | ○ | ○ | ○ | ○ | ○ | ○ | × | ○ | ○ | ○ | ○ | ○ |
| Ad2 | ○ | ○ | × | ○ | ○ | ○ | ○ | ○ | ○ | ○ | ○ | ○ |

AUTOMATED ERROR DETECTION FOR MULTIPLE BLOCK MEMORY ARRAY CHIP AND CORRECTION THEREOF

BACKGROUND OF THE INVENTION

1. Field of the Invention

The invention relates generally to error detection and correction circuitry for semiconductor memory devices, and more particularly, to automated, on-chip error detection for semiconductor chips containing multiple block memory arrays and correction thereof.

2. Description of the Prior Art

Recently, soft errors become a problem in a semiconductor memory device, wherein the information stored in a memory cell changes erroneously due to the entrance of $\alpha$ particles. The $\alpha$ particles are generated from radioactive materials included in the package material and the like. In order to solve the problem, an error check and correction (hereinafter referred to as ECC) function is provided on or external to the semiconductor memory device, whereby errors in information due to the soft errors are corrected. Consequently, the reliability of the semiconductor memory device can be enhanced.

Figure 1:
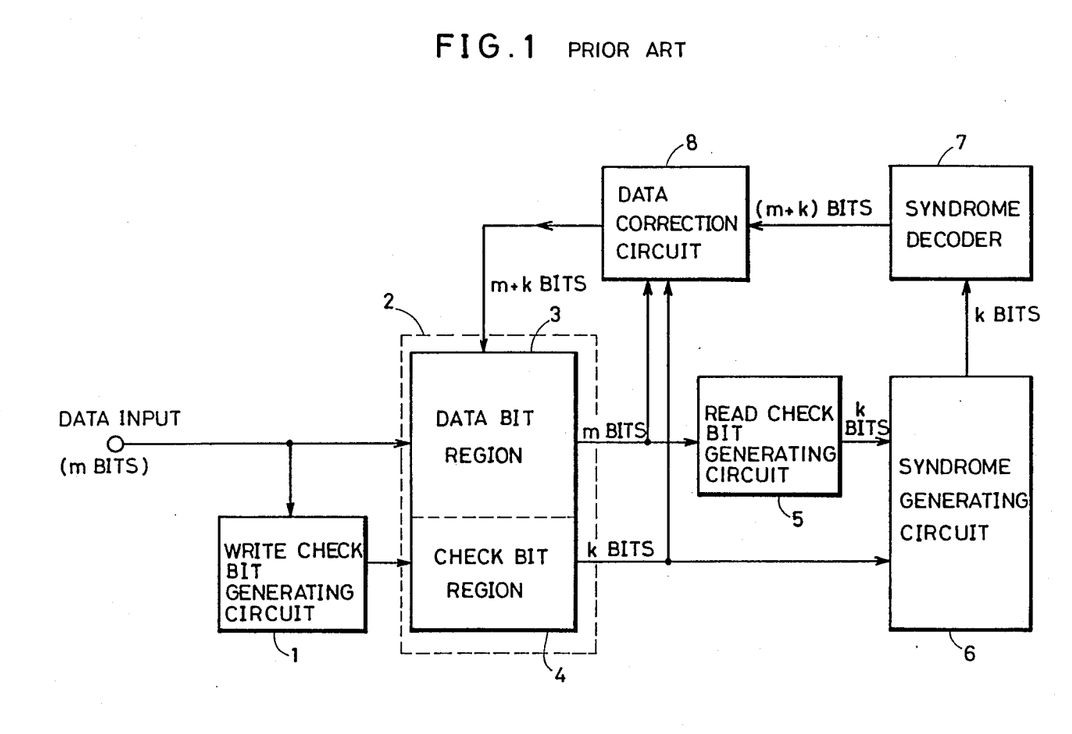
FIG. 1 is a block diagram for illustrating the structure of a conventional ECC semiconductor memory device having an ECC function.

The semiconductor memory device having the ECC function will be described in the following. FIG. 1 shows a structure of one example of a conventional semiconductor memory device having the ECC function. The semiconductor memory device comprises a write check bit generating circuit 1, a memory cell array 2, a read check bit generating circuit 5, a syndrome generating circuit 6, a syndrome decoder 7 and a data correction circuit 8. The memory cell array 2 comprises a data bit region 2 in which a plurality sets of data bits are stored and a check bit region 3 in which the corresponding plurality sets of check bits are stored. Each set of data bits comprises m bits and each set of check bits comprises k bits. Here, m is, for example, 16 and k is, for example, 6. Data bits and check bits are respectively inputted/outputted in parallel to and from the data bit region 3 and the check bit region 4 in accordance with an address signal.

The ECC function in the semiconductor memory device of FIG. 1 is generally effected in the following manner. In writing data, the write check bit generating circuit 1 generates a check bit having k bits based on a set of data bits having m bits in accordance with the structure of the error check and correction code. The check bits generated by the write check bit generating circuit 1 in this manner are called write check bits. The data bits and the write check bits are written in the data bit region 3 and the check bit region 4 of the memory cell array 2, respectively. A block of (m+k) bits consisting of a set of the data bits of m bits and a set of the check bits of k bits is called a ECC code word or simply an ECC word. The ECC code word is a unit in the error check and correction. Namely, the error check and correction are carried out for every ECC code word.

In reading data, a set of data bits of m bits and the corresponding set of write check bits of k bits are simultaneously read from the data bit region 3 and the check bit region 4, respectively, based on an address signal. The data bit is inputted to the read check bit generating circuit 5 and to the data correction circuit 8. The write check bits are inputted to the syndrome generating circuit 6 and to the data correction circuit 8. The read check bit generating circuit 5 generates a set of check bits of new k bits based on the inputted set of data bits of m bits in accordance with the structure of the error check and correction code. The check bits generated from the read check bit generating circuit 5 in this manner are called read check bits. The syndrome generating circuit 6 carries out exclusive OR operation for the write check bits read from the check bit region 4 and for the read check bits generated from the read check bit generating circuit 5, bit by bit. The result of the exclusive OR operation is called a syndrome. The syndrome is a data train consisted by k bits, comprising information indicating the location of the error bit. When all bits of the syndrome are "0", that is, when the write check bits and the read check bits coincide with each other, it is determined that there is no error and otherwise, it is determined that there is an error.

The syndrome having k bits generated from the syndrome generating circuit 6 is applied to the syndrome decoder 7. The syndrome decoder 7 generates a code of (m+k) bits which designates the error bit out of the set of data bits having m bits and the set of write check bits having k bits by decoding the syndrome of k bits. More specifically, it outputs a code in which only the position corresponding to the error bit becomes "1" and other positions become "0" in the (m+k) bits. The data correction circuit 8 inverts and therefore corrects one or a plurality of error bits from the data bits and the check bits read from the data bit region 3 and from the check bit region 4 in accordance with the (m+k) bit code. In this manner, the error check and correction of the data is effected. The error corrected (m+k) bits are written in the original position in the memory cell array 2.

Actually, the ECC circuit system such as described above is provided on the memory chip or out of the memory chip and the correction of errors due to the soft error is carried out by that ECC circuit system. In a semiconductor memory device having such ECC circuit system, not only the above described soft errors but also hard errors can be corrected. The hard error is a defect generated in manufacturing the memory chip and is a fixed error. The memory chip having a defect which can be corrected by the above mentioned ECC circuit system may be regarded as a sound chip. Therefore, by substantially repairing hard errors generated in manufacturing the memory chip by the ECC circuit system, especially on chip ECC, the production yield can be enhanced.

Now, the error check and correction code is capable of detecting an error if the number of error bits included in a unit of the above mentioned ECC code word (consisted by a set of data bits of m bits and a set of check bits of k bits in the above example) is p or less than p bits and it is capable of correcting an error if the number is q or less than q bits, where $p > q$. Such error check and correction code is called a q bit error detection—p bit error correction code. Usually, a double error correction —triple error detection (DEC-TED) code, single error correction—double error detection (SEC-DED) code, and the like are used. In the following, description will be given of a case in which a defect (hard error) of a memory cell is repaired, that is, corrected, by employing the SEC-DED code, in order to simplify the description.

Figure 2:
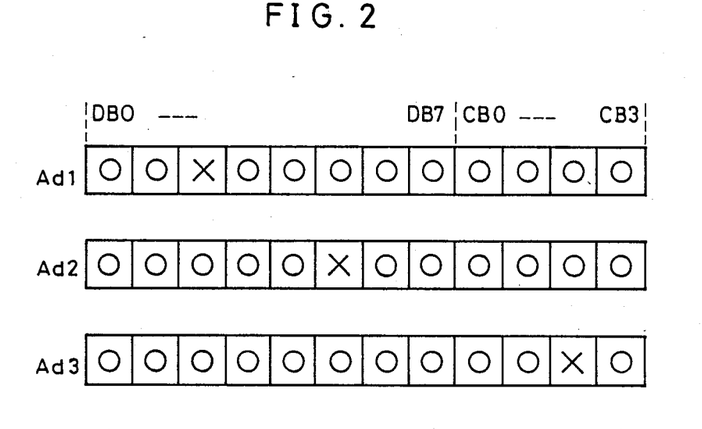
FIG. 2 shows the state of bits respectively selected by three address signals, showing three sets of bits each comprising one defective bit.

FIG. 2 shows the state of the bits selected by the address signals Ad1, Ad2 and Ad3, respectively. In FIG. 2, DB0 to DB7 denote data bits and CB0 to CB3 denote check bits. In this case, m=8 and k=4. More specifically, 12 bit data are simultaneously inputted or outputted in parallel in accordance with the inputted address signals Ad1, Ad2 and Ad3, respectively. The 12 bits corresponding to each of the address signals constitute an ECC code word. If an error of 1 bit exists in the ECC code word, the error can be corrected. In FIG. 2, a circle denotes a normal bit while x denotes a defective bit. When there is 1 bit error or no bit error in the 12 bits selected by each of the address signal, as shown in FIG. 2, the error can be corrected by the SEC-DED code. The semiconductor memory device including such defective bit can be regarded as a sound device provided that it comprises the ECC function employing the SEC-DED code.

Figure 3:
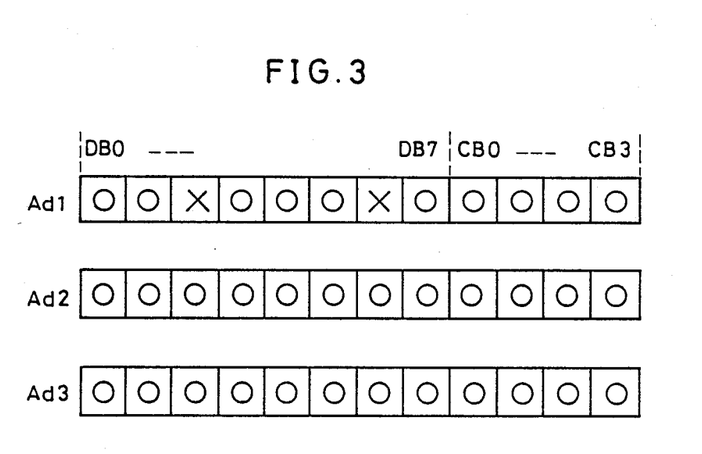
FIG. 3 shows the state of bits respectively selected by three address signals, showing a set of bits comprising two defective bits and two sets of bits comprising no defective bits.

Next, description will be given of a case in which the defective bits are distributed as shown in FIG. 3. Referring to FIG. 3, two defective bits are included in the 12 bits selected by the address signal Ad1. These two defective bits can not be corrected by the ECC function employing the SEC-DED code. Therefore, although there are no defective bits included in the respective 12 bits selected by other address signals Ad2 and Ad3, there is an error which can not be corrected when viewed as a whole. Therefore, the memory chip including such defective bits is regarded as a defective one.

Figure 4:
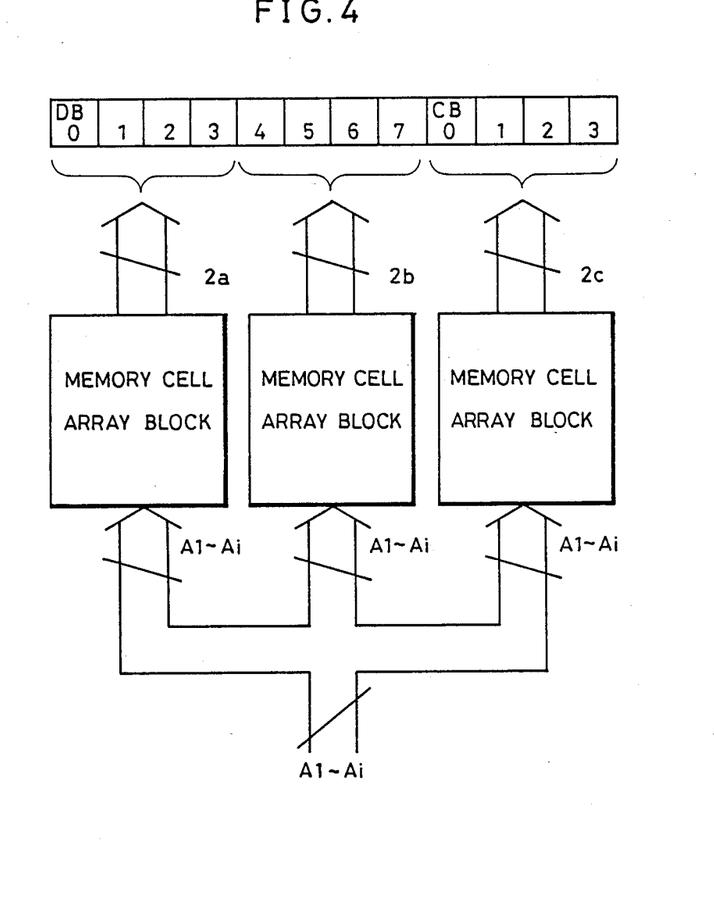
FIG. 4 shows a structure of a memory cell array in a conventional semiconductor memory device having the ECC function.

As described above, not the number of the defective bits in the memory cell array but the distribution of the defective bits has a large influence of the lowering of the production yield. For example, when parallel data of 12 bits are inputted or outputted, the memory cell array is usually divided into a plurality of blocks in some way or another and data of one or a plurality of bits are inputted or outputted to or from each block. A common address signal (a row address signal and a column address signal) is inputted to these blocks. The address signal is decoded by a decoder, whereby the memory cell corresponding to the address signal is selected. In FIG. 4, the memory cell array is divided into three blocks 2a, 2b and 2c. 4 bits of a set of data bits are stored in the block 2a, another 4 bits of a set of data bits are stored in the block 2b and a set of check bits having 4 bits is stored in the block 2c.

Since a conventional semiconductor memory device having the ECC function is structured as described above, the production yield may be significantly lower dependent on the distribution of the defective bits (address position) even if the total number of the defective bits is small.

In IBM' Technical Disclosure Bulletin Vol. 26, No. 6, Nov. 1983, pp. 2747–2748, a following description is disclosed:

"In the design of fault tolerant memory using fault alignment exclusion-inclusion techniques, if a chip with a bit line fail aligns with another chip with a word line fail, then the memory produces a memory word with a 2-bit error. If the memory is equipped with SEC/DED code, then through address translation these two chips are misaligned so that the memory word in the reconfigured memory has only a 1-bit error. Such a reconfiguration using address translation alone limits the number of bit line, word line and cell fails which can be dispersed."

To our knowledge, however, the above described technique is not suitable for automated testing of multiple block memory array of a single chip and according to such technique, it is virtually impossible to implement an external program such as a laser melting program.

SUMMARY OF THE INVENTION

One object of the invention is to provide improved error detection and correction for semiconductor memory devices.

Another object of the invention is to provide error detection and correction for semiconductor memory devices forming multiple block memory arrays.

Another object is to provide error detection and correction for semiconductor memories forming multiple block memory arrays on a common chip.

A further object of the invention is to provide a method of and system for automated, on-chip error detection for multiple block, single-chip semiconductor memory arrays and correction of errors.

A still further object of the invention is to provide a method of and system for automated, on-chip error detection for multiple block, single-chip semiconductor memory arrays wherein an external source of energy is used to carry out error correction by melting particular fuses formed with the memory array on the same chip.

In order to attain the above described objects, the semiconductor memory device in accordance with the present invention comprises: a semiconductor chip, a plurality of memory cell array blocks formed on the chip, a plurality of selecting means formed on the chip and corresponding with the plurality of memory cell array blocks, error check and correction means formed on the chip, and a plurality of address signal changing means formed on the chip and corresponding with each of the plurality of memory cell array blocks. Each of the memory cell array blocks comprises a plurality of memory cells. The selecting means selects any of the plurality of memory cells in the corresponding memory array block in response to an externally applied address signal. The memory cell array blocks are arranged together to store data words. The error check and correction means checks and corrects errors included in information stored in a plurality of memory cells which are simultaneously selected by the plurality of selecting means. The number of the errors correctable by the error check and correction means within a word is less than a prescribed number. Each of the address signal changing means includes link means and can be previously set by cutting any of the link means to change the externally applied address signal so that the number of errors within a word becomes less than the prescribed number.

In accordance with another aspect of the present invention, there is provided a system for automated, on-chip error detection for semiconductor chips containing multiple block memory arrays and correction thereof. The system comprises a semiconductor memory device, determining means, and control means. The semiconductor memory device comprises a semiconductor chip, a plurality of memory cell array blocks, a plurality of selecting means formed on the chip and corresponding with the plurality of memory cell array blocks, error check and correction means formed on the chip, and a plurality of address signal changing means formed on the chip and corresponding with each of the plurality of memory cell array blocks. Each of memory cell array blocks comprises a plurality of memory cells. The selecting means selects any of the plurality of memory cells in the corresponding memory array block in response to an externally applied address signal. The memory cell array blocks are arranged together to store data words. The error check and correction means checks and corrects errors included in information stored in a plurality of memory cells which are simultaneously selected by the plurality of selecting means. The number of the errors correctable by the error check and correction means within a word is less than a prescribed number. The address signal changing means includes meltable links. The determining means determines whether a number of defective memory cells within a word is equal to or greater than the prescribed number. The control means is responsive to the determining means for generating control signal to control energy from an external energy source to melt any of the links to change the externally applied address signal.

In the semiconductor memory device in accordance with the present invention, when there are defective memory cells the number of which is larger than the number correctable by a prescribed error check and correction function in a plurality of memory cells which are simultaneously selected by a plurality of selecting means in response to an address signal, the address position of the defective memory cells can be changed so that the number of defective memory cells in the simultaneously selected plurality of memory cells does not exceed the correctable number.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 5:
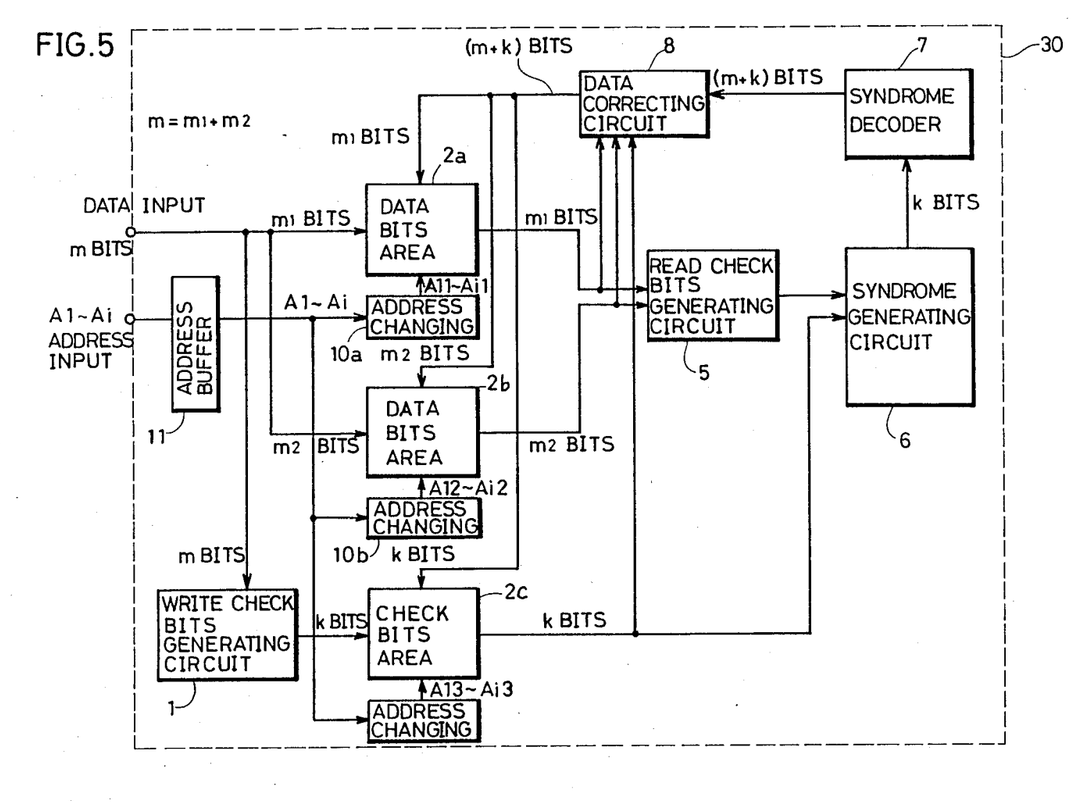
FIG. 5 is a block diagram showing the structure of a semiconductor memory device having a defect repairing function in accordance with one embodiment of the present invention.

Embodiments of the present invention will be hereinafter described with reference to the figures. FIG. 5 shows a structure of a semiconductor memory device having a defect repairing function in accordance with one embodiment of the present invention.

The memory cell array is divided into three blocks 2a, 2b and 2c. Blocks 2a and 2b are used as the data bit region and the block 2c is used as a check bit region. Address changing system 10a, 10b and 10c are respectively provided in the blocks 2a, 2b and 2c. Common address signals A1 to Ai are applied to the address changing systems 10a, 10b and 10c through an address buffer 11. The address changing system 10a applies address signals A11 to Ai1 to the block 2a in response to address signals A1 to Ai. The address changing system 10b applies address signals A12 to Ai2 to the block 2b in response to the address signals A1 to Ai. The address changing system 10c applies address signals A13 to Ai3 to the block 2c in response to the address signals A1 to Ai. The semiconductor memory device comprises, as is the same as the conventional semiconductor memory device shown in FIG. 1, a write check bit generating circuit 1, a read check bit generating circuit 5, a syndrome generating circuit 6, a syndrome decoder 7 and a data correcting circuit 8. The portions shown in FIG. 5 are formed on the same chip 30.

In writing data, $m_1$ bits out of the m bits of the data bits are written in that region in the block 2a which is designated by the address signals A11 to Ai1 and remaining $m_2$ bits out of the m bits of data bits are written in that region of the block 2b which is designated by the address signals A12 to Ai2. At the same time, the data bits comprising the m bits are applied to the write check bit generating circuit 1. The write check bit generating circuit 1 generates check bits comprising k bits based on the data bits comprising the m bits in accordance with the structure of the error check and correction code. The check bits comprising k bits generated in this manner is written in that region of the block 2c which is designated by the address signals A13 to Ai3 as write check bits.

In the data reading, the data bits of $m_1$ bits read in accordance with the address signals A11 to Ai1 and the data bits of $m_2$ bits read from the block 2b in accordance with the address signals A12 to Ai2 are applied to the read check bit generating circuit 5 and the data correction circuit 8. The write check bits comprising k bits read from the block 2c in accordance with the address signals A13 to Ai3 are applied to the syndrome generating circuit 6 and the data correction circuit 8. The read check bit generating circuit 5 generates new check bits of k bits based on the data bits of $m_1$ bits and the data bits of $m_2$ bits in accordance with the structure of the error check and correction code. The syndrome generating circuit 6 carries out the exclusive OR operation for the write check bits read from the block 2c and the read check bits generated from the read check bit generating circuit 5, bit by bit. The syndrome generating circuit 6 generates the result of the exclusive OR operation as a syndrome. The syndrome comprising k bits is applied to the syndrome decoder 7. The syndrome decoder 7 generates a code of (m+k) bits designating the position of an error bit in the data bits of m bits and in the write check bits of k bits by decoding the syndrome comprising k bits. For example, it generates a code in which only the position corresponding to the error bit becomes "1" and others become "0" in the (m+k) bits. The data correction circuit 8 inverts and therefore corrects one or a plurality of error bits out of the data bits and the check bits read from the blocks 2a, 2b and 2c in accordance with the code comprising (m+k) bits. The (m+k) bits corrected in this manner are once again written in the original position in the blocks 2a, 2b and 2c.

The error check and correction in this embodiment is carried out in accordance with a known ECC code such as disclosed in "Error-Correcting Codes for Semiconductor Memory Applications: A State of the Art Review", by C. L. Chen and M. Y. Hsiao, IBM J. RES. DEVELOP, VOL. 28, NO. 2, Mar. 1980.

Figure 6:
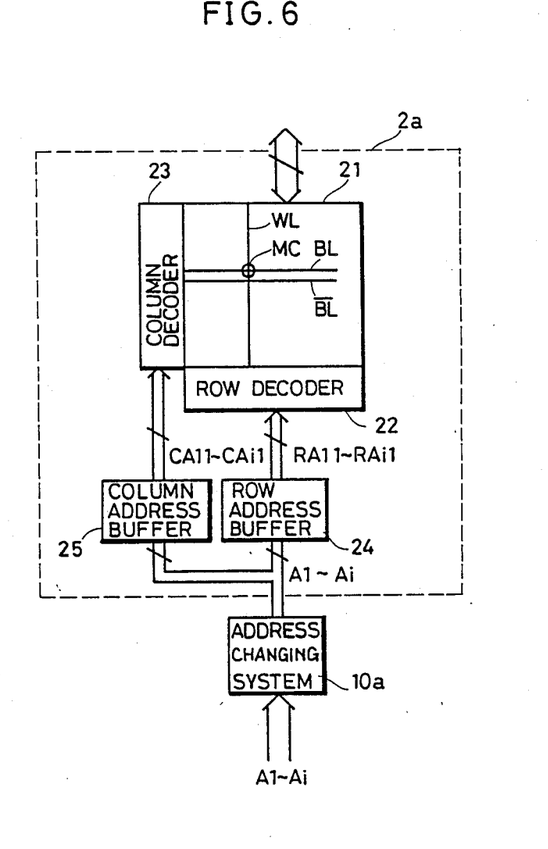
FIG. 6 shows a structure of a memory cell array block included in the semiconductor memory device of FIG. 5.

FIG. 6 shows the structure of the block 2a shown in FIG. 5. The block 2a comprises a memory cell array 21, a row decoder 22, a column decoder 23, a row address buffer 24 and a column address buffer 25. The memory cell array 21 comprises a plurality of word lines, a plurality of bit line pairs arranged so as to cross the plurality of word lines and memory cells each provided at each intersection of the word line and the bit line. In FIG. 6, only one word line WL, one set of bit line pair BL, $\overline{BL}$ and one memory cell MC provided at an intersection of the word line WL and the bit line BL are shown. A plurality of word lines are connected to the row decoder 22. The plurality of bit line pairs are connected to the column decoder 23. The row address buffer 24 applies address signals A1 to Ai applied from an address changing system 10a to a row decoder 22 as row address signals RA11 to RAi1 at a prescribed timing. The row address decoder 22 selects one from the plurality of word lines in response to the row address signals RA11 to RAi1. The column address buffer 25 applies address signals A1 to Ai applied from the address changing system 10a to the column decoder 23 as column address signals CA11 to CAi1 at a prescribed timing. The column decoder 23 selects any of the plurality of bit line pairs in response to the column address signals CA11 to CAi1. The reading or writing of data is carried out to or from the memory cell at the intersection of the selected word line and the selected bit line. The structures of the blocks 2b and 2c shown in FIG. 5 are completely the same as that of block 2a shown in FIG. 6.

Figure 7:
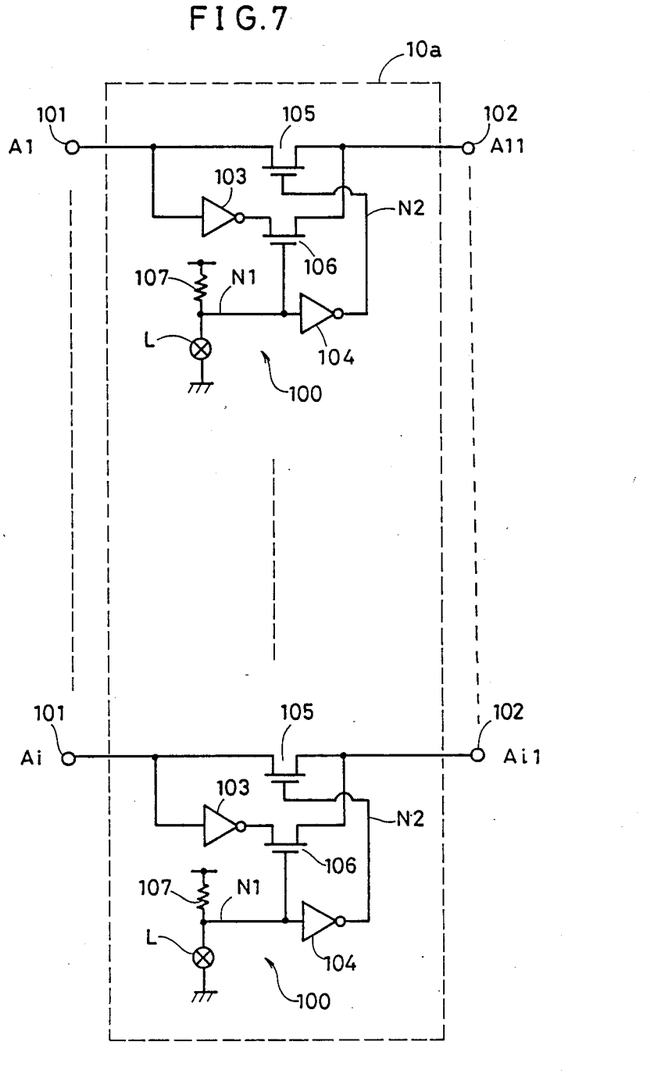
FIG. 7 is a schematic diagram showing a structure of an address changing system included in the semiconductor memory device of FIG. 5.

FIG. 7 is a schematic diagram showing the structure of the address changing system 10a shown in FIG. 5. The address changing system 10a comprises a plurality of input terminals 101 and the corresponding plurality of output terminals 102. A changing circuit 100 is connected between each of the input terminals 101 and each of the corresponding output terminals 102. Each changing circuit 100 comprises inverters 103 and 104, N channel MOS transistors 105 and 106, a resistance 107 and a linking device (a link element or a programmable link) L. The transistor 105 is connected between the input terminal 101 and the output terminal 102. The inverter 103 and the transistor 106 are connected in series between the input terminal 101 and the output terminal 102. Meanwhile, the resistance 107 and the linking device L are coupled in series between the supply potential $V_{CC}$ and the ground potential. A node N1 between the resistance 107 and the linking device L is connected to the gate of the transistor 106 and is connected to the gate of the transistor 105 through the inverter 104. The linking device L is formed of polycrystalline silicon, aluminum, or the like and is capable of being blown out by laser beam and the like. Address signals A1 to Ai are applied to the plurality of input terminals 101, respectively, and address signals Ai1 to Ai1 are respectively outputted from the plurality of output terminals 102.

In each changing circuit 100, when the linking device L is not cut, the potential at the node N1 becomes "L" level. Therefore, the potential at a node N2 between the inverter 104 and the transistor 105 becomes the "H" level. Therefore, the transistor 105 turns on and the transistor 106 turns off. Consequently, the address signal applied to the input terminal 101 is directly outputted from the output terminal 102. More specifically, the condition Ai1=Ai is satisfied. Meanwhile, when the linking device L is cut by a laser beam or the like, the potential at the node N1 becomes "H" level and the potential at the node N2 becomes "L" level. Therefore, the transistor 105 turns off and the transistor 106 turns on. Consequently, the address signal applied to the input terminal 101 is inverted by the inverter 103 to be outputted from the output terminal 102. Namely, for example, the condition Ai1=$\overline{Ai}$ is satisfied. In this manner, by blowing out some of the plurality of the linking devices L included in the address changing system 10a in advance by a laser beam or the like, only these address signals which are applied to the input terminals 101 corresponding to the linking devices L which are blown out are inverted and outputted, while other address signals are directly outputted.

The structure of the address changing systems 10b and 10c shown in FIG. 5 are completely the same as that of the address changing system 10a shown in FIG. 7.

Figure 9:
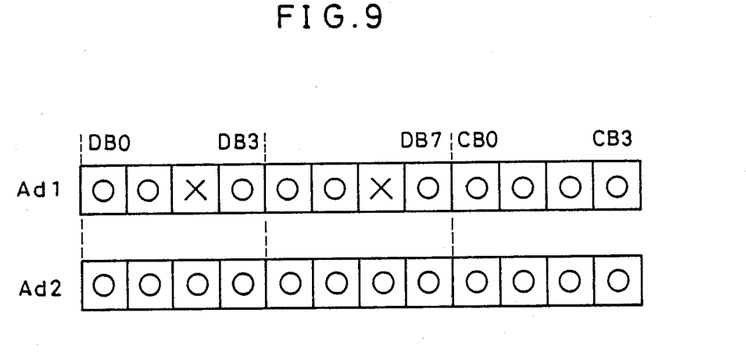
FIG. 9 shows the states of the two sets of bits respectively selected by two address signals, showing a set of bits comprising two defective bits and a set of bits comprising no defective bit.
Figure 10:
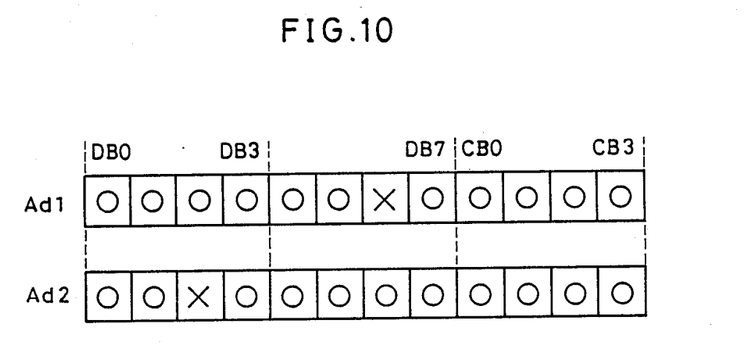
FIG. 10 shows the distribution of the defective bits included in FIG. 9 changed by the address changing system.

The defect repairing function in the semiconductor memory device of this embodiment will be described in the following with reference to FIGS. 8 to 10.

Figure 8:
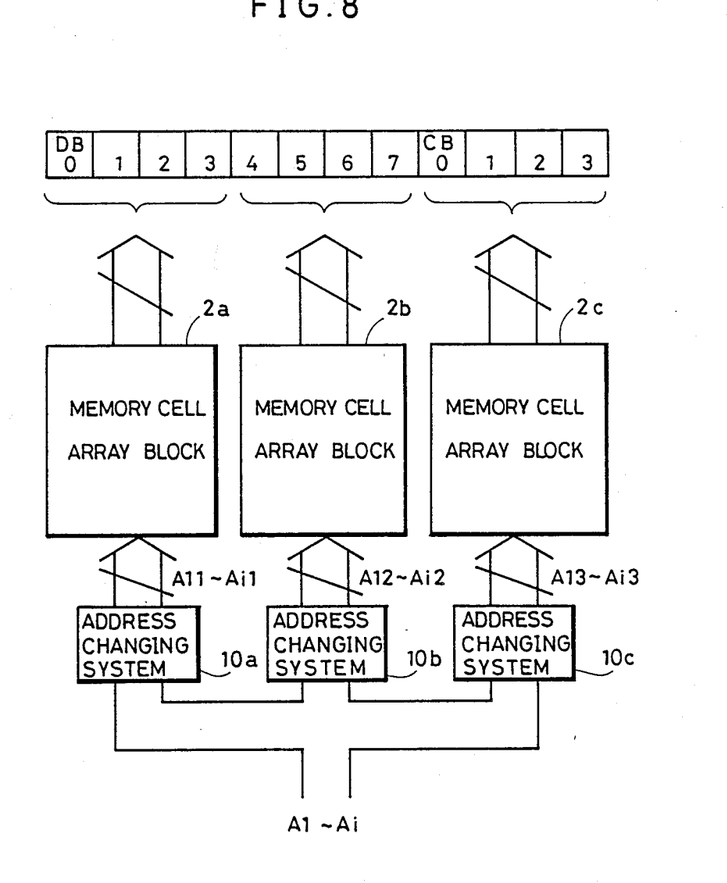
FIG. 8 is a diagram for illustrating the operation of the address changing system included in the semiconductor memory device of FIG. 5.

Referring to FIG. 8, in the address changing systems 10a, 10b and 10c, when no linking device L is cut, the same address signals as the inputted address signals A1 to Ai are applied to the blocks 2a, 2b and 2c. When any of the linking devices L included in each of the address changing systems 10a, 10b and 10c is cut, the address changing systems 10a, 10b and 10c invert only that address signal corresponding to the cut linking device L to apply the same to the corresponding blocks 2a, 2b and 2c. In each of the blocks 2a, 2b and 2c, four bits are selected respectively in response to the address signals applied from the address changing systems 10a, 10b and 10c. In FIG. 9, two defective bits denoted by x are included in the 12 bits selected by the address signal Ad1 and no defective bit is included in the 12 bits selected by the address signal Ad2. In this case, the error correction can not be carried out by the SEC-DED code. Therefore, by previously blowing out the prescribed linking device L included in the address changing system 10a by a laser beam or the like, the address signals Ad1 and Ad2 are changed with each other only for the four bits (DB0 to DB3) corresponding to the block 2a. Namely, the address changing system 10a is set previously such that it outputs the address signal Ad2 when the address signal Ad1 is applied and it outputs the address signal Ad1 when the address signal Ad2 is applied. Consequently, there is one defective bit included in the 12 bits selected by the address signal Ad1 and one defective bit in the 12 bits selected by the address signal Ad2. Since such defective bits can be corrected respectively by the SEC-DED code, the repair of defects in this semiconductor memory device become possible. At this time, the address signals A12 to Ai2 outputted from the address changing system 10b are the same as the address signals A1 to Ai, and the address signals A13 to Ai3 outputted from the address changing system 10c are also the same as the address signals A1 to Ai.

Actually, often two defective bits are included only in the bits selected by the address signal Ad1 and no defective bit is included in the bits selected by other address signals. Therefore, in many cases, the change of addresses for other address signals may be simultaneously carried out with the replacing operation between the address signals Ad1 and Ad2.

As described above, when defective bits of two or more than two bits are generated in the plurality of bits which are simultaneously selected by one address signal in manufacturing a memory chip, the address can be changed so that defective bits of two or more than 2 bits do not exist in the plurality of bits selected by each address signal, by previously cutting a prescribed linking device L in the address changing systems 10a, 10b and 10c.

Figure 11:
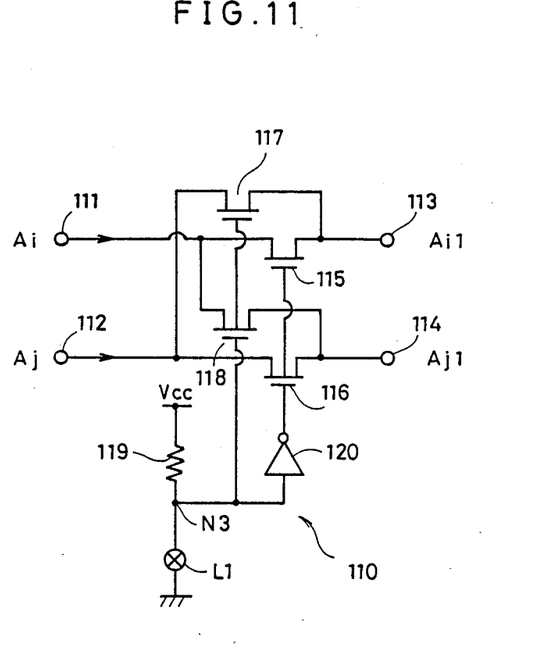
FIG. 11 is a schematic diagram showing another structure of the address changing system.

FIG. 11 shows another example of the address changing circuit included in the address changing system. The address changing circuit 110 in FIG. 11 comprises two input terminals 111 and 112 and two output terminals 113 and 114. An N channel MOS transistor 115 is connected between the input terminal 111 and the output terminal 113, while an N channel MOS transistor 116 is connected between the input terminal 112 and the output terminal 114. An N channel MOS transistor 117 is connected between the input terminal 112 and the output terminal 113, while an N channel MOS transistor 118 is connected between the input terminal 111 and the output terminal 114. Meanwhile, a resistance 119 and a linking device L1 are coupled in series between the supply potential $V_{CC}$ and the ground potential. A node N3 of the resistance 119 and a linking device L1 is connected to the gates of the transistors 117 and 118 and is connected to the gates of the transistors 115 and 116 through an inverter 120.

In this address changing circuit 110, when the linking device L1 is not cut, the potential at the node N3 becomes "L" level. Consequently, the transistors 115 and 116 turn on while the transistors 117 and 118 turn off. As a result, the input terminal 111 and the output terminal 113 are connected to each other and the input terminal 112 and the output terminal 114 are connected to each other. Therefore, an address signal applied to the input terminal 111 is outputted from the output terminal 113 and an address signal applied to the input terminal 112 is outputted from the output terminal 114. Namely, the condition Ai1=Ai and Aj1=Aj are satisfied. Meanwhile, when the linking device L1 is cut, the potential at the node N3 becomes "H" level. Consequently, the transistors 115 and 116 turn off and the transistors 117 and 118 turn on. Therefore, the input terminal 111 and the output terminal 114 are connected to each other and the input terminal 112 and the output terminal 113 are connected to each other. Therefore, an address signal applied to the input terminal 111 is outputted from the output terminal 114 and an address signal applied to the input terminal 112 is outputted from the output terminal 113. Namely, the condition Ai1=Aj and Aj1=Ai are satisfied.

Figures 12, 12A:
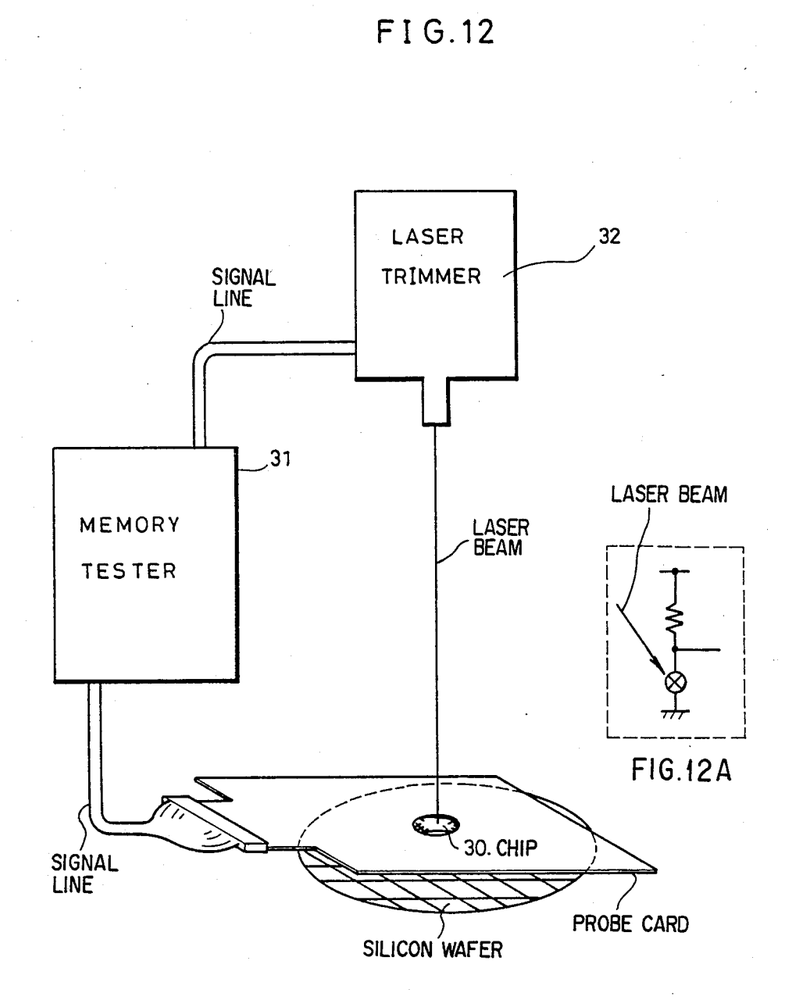
FIG. 12 shows a system for automated error detection and correction of the semiconductor memory device of FIG. 5.
FIG. 12A shows the laser beam impinging on a link device of the semiconductor chip of FIG. 12.
Figure 13:
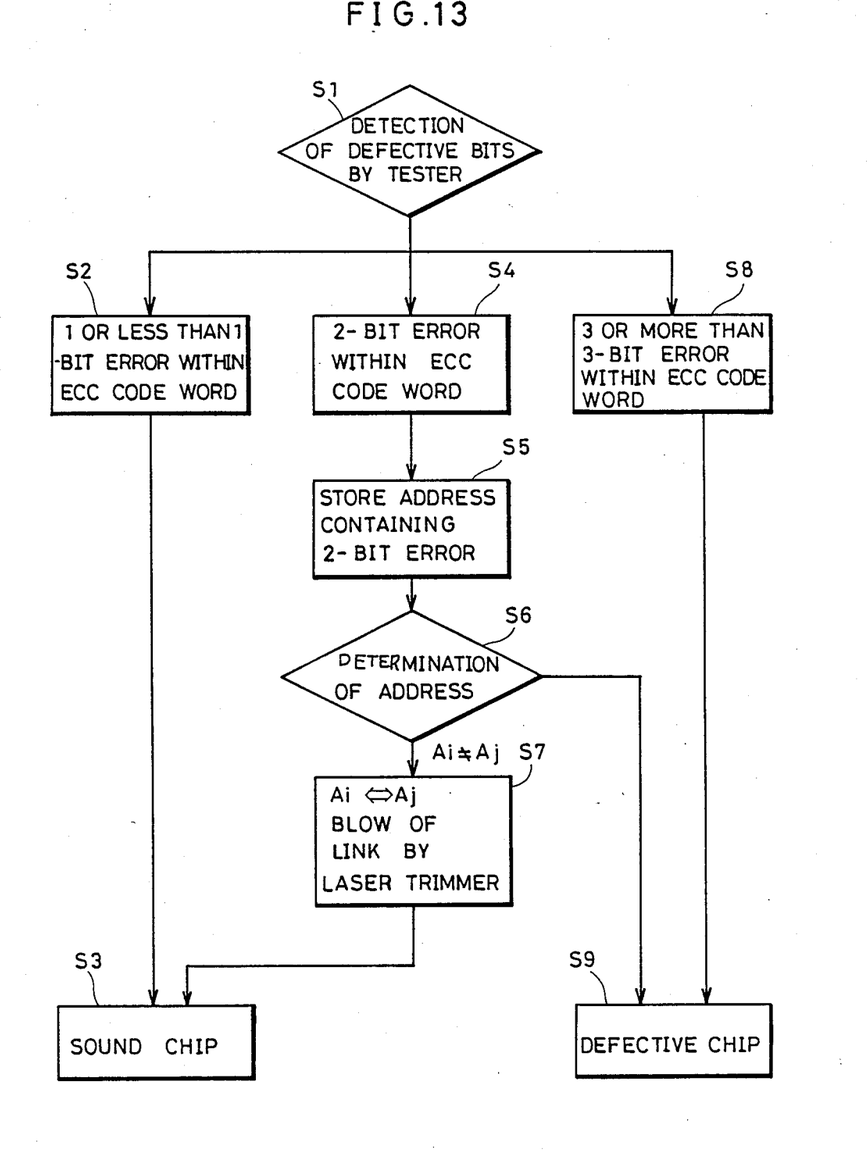
FIG. 13 is a flow chart for explaining an operation of the system of FIG. 12.

FIG. 12 shows a system for automated error detection and correction of the above described semiconductor memory device. FIG. 13 is a flow chart for explaining an operation of the system. It is assumed that the semiconductor memory device has the ECC function employing the SED-DED code and the address changing circuit shown in FIG. 11.

Defective bits in the semiconductor chip 30 are detected by a memory tester 31 in FIG. 12 (the step S1). When two or more than two defective bits are not detected within any of the ECC code words (the step S2), the semiconductor chip 30 is regarded as a sound chip (the step S3). When two defective bits are detected within any of the ECC code words (the step S4), an address corresponding to the ECC code word containing the two defective bits is stored in the memory tester 31 (the step S5). The memory tester 31 determines whether the number of defective bits is equal to one or less than one within every ECC code word by replacing the address signal Ai with the address signal Aj and replacing the address signal Aj with the address signal Ai (the step S6). If the number of defective bits becomes equal to one or less than one by replacement of the address signals Ai and Aj, the link device L1 in the address changing circuit in the semiconductor chip 30 is blown out by a laser trimmer 32 (the step S7), so that the semiconductor chip 30 is regarded as a sound chip (the step S3). If the number of defective bits does not become equal to or less than one even by replacement of Ai and Aj, the semiconductor chip 30 is regarded as a defective chip (the step S9).

When three or more than three defective bits are detected within any of the ECC code words (the step S8), the semiconductor chip 30 is regarded as a defective chip (the step S9).

In this manner, the change of addresses can be independently carried out for each block in the memory cell array by very simple means. Consequently, the seeming address position of the defective bit can be replaced, whereby the defective bit can be repaired.

Although description was given of a case in which four bits of data are inputted or outputted in parallel in each block of the memory cell array in the above embodiment, the data comprising other bit numbers may be inputted or outputted to and from each block. Although a linking device which can be blown out by a laser beam or the like is employed for the address changing circuit in the address changing system in the above described embodiment, a programmable device or an electrical switch such as EPROM, a resistor and so on may be employed instead of the linking device.

In addition, although description was given of a case in which the error detection and correction are carried out in accordance with SEC-DED code and the like in order to simplify the description in the above embodiment, the error detection and correction may be carried out employing the DEC-TED code and the like.

As described above, according to the present invention, the seeming address position of defective memory cells can be changed so that the number of the defective memory cells existing in a plurality of memory cells which are simultaneously selected in response to an address signal does not exceed the number which can be corrected by a prescribed error check and correction function. Therefore, the repairing of the defective bits which could not be repaired in the conventional way becomes possible without providing an extra memory cell, whereby the production yield of the semiconductor memory device is enhanced.

According to the present invention, improved error detection and correction for semiconductor memory devices is provided. In addition, error detection and correction for semiconductor memory devices forming multiple block memory arrays is provided. Furthermore, error detection and correction for semiconductor memories forming multiple block memory arrays on a common chip is provided. Furthermore, a method of and system for automated, on-chip error detection for multiple block, single-chip semiconductor memory arrays and correction of errors are provided. Furthermore, there are provided a method of and system for automated, on-chip error detection for multiple block, single-chip semiconductor memory arrays wherein an external source of energy is used to carry out error correction by melting particular fuses formed with the memory array on the same chip.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor memory device having integral error check and correction circuitry, comprising:
    a semiconductor chip,
    a plurality of memory cell array blocks each comprising a plurality of memory cells formed on said chip;
    a plurality of selecting means formed on said chip and corresponding with said plurality of memory cell array blocks for selecting any of said plurality of memory cells in said corresponding memory array block in response to an externally applied address signal, said memory cell array blocks being arranged together to store data words, each data word comprising at least two of said memory cell array blocks;
    error check and correction means formed on said chip for checking and correcting errors included in information stored in a code word, said code word representing a plurality of said memory cell array blocks and including a data word region and a check bit region together comprising a plurality of memory cells which are simultaneously selected by said plurality of selecting means, the number of said errors correctable by said error check and correction means within a code word being less than a prescribed number; and
    a plurality of address signal changing means formed on said chip and corresponding with each of said plurality of memory cell array blocks,
    each of said address signal changing means including link means and being capable of being previously set by cutting any of said link means to change said externally applied address signal corresponding to an individual memory array block so that the number of errors within a code word becomes less than said prescribed number.

2. A semiconductor memory device according to claim 1, wherein
    each of said address signal changing means can be previously set to change said externally applied address signal to another address signal or outputs said address signal directly, dependent on either any of said link means being cut or not.

3. A semiconductor memory device according to claim 2, wherein said link means comprises a fusible link which can be blown out by a laser beam.

4. A semiconductor memory device according to claim 1, wherein
    each of said address signal changing means comprises:
    a plurality of input terminals each receiving an address signal;
    a plurality of output terminals each provided in correspondence with each of said plurality of input terminals; and
    a plurality of address changing circuits each coupled between each of said plurality of input terminals and each of said plurality of output terminals; and
    each of said address changing circuits comprises:
    link means which can be previously cut;
    inverting means for inverting an address signal applied to said corresponding input terminal; and
    selecting means which applies an address signal applied to said corresponding input terminal to said corresponding output terminal or applies an address signal inverted by said inverting means to said corresponding output terminal dependent on either said link means being cut or not.

5. A semiconductor memory device according to claim 1, wherein
    each of said address signal changing means comprises:
    a first input terminal;
    a second input terminal;
    a first output terminal;
    a second output terminal;
    link means which can be previously cut; and
    a selecting circuit which applies an address signal applied to said first input terminal to said first output terminal and applies an address signal applied to said second input terminal to said second output terminal, or applies an address signal applied to said first input terminal to said second output terminal and applies an address signal applied to said second input terminal to said first output terminal, dependent on either said link means being cut or not.

6. A semiconductor memory device according to claim 1, wherein
    each of said memory cell array blocks comprises:
    a plurality of word lines;
    a plurality of bit lines arranged so as to cross said word lines; and
    a plurality of memory cells each provided at each of the intersections of said plurality of word lines and said plurality of bit lines; and
    said selecting means comprises:
    a first decoder responsive to said address signal for selecting any of said plurality of word lines; and
    a second decoder responsive to said address signal for selecting any of said plurality of bit lines.

7. A semiconductor memory device according to claim 1, wherein
    some of said plurality of memory cell array blocks are defined to be memory cell array blocks for data;
    some of said plurality of memory cell array blocks are determined to be memory cell array blocks for check bits; and
    said error check and correction means comprises:

first check bit generating means for generating, when writing data in said memory cell array blocks for data, a check bit based on the data and applying the same to said memory cell array blocks for check bit;

second check bit generating means for generating, when reading data from said memory cell array blocks for data, a check bit based on the data;

error check means for checking, based on said check bit stored in said memory cell array blocks for check bit and on said check bit generated by said second check bit generating means, an error bit of said corresponding data; and error correction means for correcting said error bit of the data in response to an output from said error check means.

8. A system for automated, on-chip error detection for a semiconductor chip containing multiple block memory arrays and correction thereof, comprising;

a semiconductor chip;

a plurality of memory cell array blocks each comprising a plurality of memory cells formed on said chip;

a plurality of selecting means formed on said chip and corresponding with said plurality of memory cell array blocks for selecting any of said plurality of memory cells in said corresponding memory array block in response to an externally applied address signal, said memory cell array blocks being arranged together to store data words, each data word comprising at least two of said memory cell array blocks;

error check and correction means formed on said chip for checking and correcting errors included in information stored in a code word, said code word representing a plurality of said memory cell array blocks and including a data word region and a check bit region together comprising a plurality of memory cells which are simultaneously selected by said plurality of selecting means, the number of said errors correctable by said error check and correction means within a code word being less than a prescribed number;

a plurality of address signal changing means formed on said chip and corresponding with each of said plurality of memory cell array blocks, said address signal changing means including meltable links;

determining means for determining whether a number of defective memory cells within a word is equal to or greater than said prescribed number; and means responsive to said determining means for generating a control signal to control energy from an external energy source to melt any of said links to change said externally applied address signal corresponding to an individual memory array block.

9. A method of automated, on-chip error detection and correction for a semiconductor memory device comprising a semiconductor chip; a plurality of memory cell array blocks each comprising a plurality of memory cells formed on said chip; a plurality of selecting means formed on said chip and corresponding with said plurality of memory cell array blocks for selecting any of said plurality of memory cells in said corresponding memory array block in response to an externally applied address signal, said memory cell array blocks being arranged together to store data words, each data word comprising at least two of said memory cell array blocks;

error check and correction means formed on said chip for checking and correcting errors included in information stored in a code word, said code word representing a plurality of said memory cell array blocks and including a data word region and a check bit region together comprising a plurality of memory cells which are simultaneously selected by said plurality of selecting means, the number of said errors correctable by said error check and correction means within a code word being less than a prescribed number; a plurality of address signal changing means formed on said chip and corresponding with each of said plurality of memory cell array blocks, said address signal changing means including meltable links; the method comprising the steps of determining whether a number of defective memory cells within a word is equal to or greater than said prescribed number; and generating a control signal to control energy from an external energy source to melt any of said links to change said externally applied address signal corresponding to an individual memory array block so that the number of errors within a word becomes less than said prescribed number.

* * * * *